US008726190B2

(12) United States Patent  
Clark et al.

(10) Patent No.: US 8,726,190 B2  
(45) Date of Patent: May 13, 2014

(54) AUTOMATICALLY TRANSFORMED GRAPHICAL USER INTERFACE (75) Inventors: Jeremy R. Clark, San Rafael, CA (US); Justin Velo, San Francisco, CA (US); Daniel Wabyick, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1438 days.

(21) Appl. No.: 11/904,926

(22) Filed: Sep. 28, 2007

(65) Prior Publication Data

US 2009/0089689 A1     Apr. 2, 2009

(51) Int. Cl.
*G09G 5/00*     (2006.01)
*G06F 3/048*    (2013.01)
*G09G 5/02*     (2006.01)
*G06F 3/01*     (2006.01)
*G06F 3/14*     (2006.01)
*G09G 5/14*     (2006.01)
*G06F 3/0481*   (2013.01)
*G06F 9/44*     (2006.01)

(52) U.S. Cl.
CPC ............ *G06F 3/1438* (2013.01); *G06F 9/4443* (2013.01); *G09G 5/14* (2013.01); *G06F 3/0481* (2013.01)
USPC ............ 715/815; 715/788; 715/798; 715/762

(58) Field of Classification Search
CPC ........ G09F 5/14; G06F 3/0481; G06F 9/4443
USPC ................... 715/815, 788, 798, 762
See application file for complete search history.

(56) References Cited

U.S. PATENT DOCUMENTS

| | | | | | |
|---|---|---|---|---|---|
| 5,561,757 | A | * | 10/1996 | Southgate | 715/790 |
| 5,675,755 | A | * | 10/1997 | Trueblood | 715/791 |
| 5,712,995 | A | * | 1/1998 | Cohn | 715/792 |
| 5,760,772 | A | * | 6/1998 | Austin | 715/798 |
| 5,956,032 | A | * | 9/1999 | Argiolas | 715/798 |
| 6,031,530 | A | * | 2/2000 | Trueblood | 715/791 |
| 6,141,008 | A | * | 10/2000 | Bloomfield | 715/800 |
| 6,377,285 | B1 | * | 4/2002 | Doan et al. | 715/764 |
| 6,473,102 | B1 | * | 10/2002 | Rodden et al. | 715/788 |
| 6,587,128 | B2 | * | 7/2003 | Kanevsky et al. | 715/768 |
| 6,832,355 | B1 | | 12/2004 | Duperrouzel et al. | |
| 7,155,682 | B2 | | 12/2006 | Rodden et al. | |
| 7,159,189 | B2 | | 1/2007 | Weingart et al. | |
| 7,216,293 | B2 | * | 5/2007 | Kataoka et al. | 715/246 |
| 7,216,302 | B2 | | 5/2007 | Rodden et al. | |
| 7,444,599 | B1 | * | 10/2008 | Chaudhri et al. | 715/830 |
| 7,568,167 | B2 | * | 7/2009 | Van Dok et al. | 715/789 |
| 7,689,927 | B2 | * | 3/2010 | Fox et al. | 715/786 |
| 7,844,917 | B2 | * | 11/2010 | Rigolet | 715/798 |

(Continued)

FOREIGN PATENT DOCUMENTS

CN     101408831     4/2009

*Primary Examiner* — Jordany Nunez
(74) *Attorney, Agent, or Firm* — Wolfe-SBMC (57) ABSTRACT

Automatically transformed graphical user interface techniques and implementations are described, including displaying a graphical user interface in a first position, the graphical user interface having a composition having an interface element, detecting an input to change the composition, and transforming the graphical user interface in response to the input comprising adjusting at least one edge of the graphical user interface and orienting the graphical user interface to a second position relative to a point in a display.

14 Claims, 8 Drawing Sheets

(56) References Cited

U.S. PATENT DOCUMENTS

| | | | |
|---|---|---|---|
| 8,065,629 B1* | 11/2011 | Ragan | 715/799 |
| 2002/0054133 A1 | 5/2002 | Jameson | |
| 2002/0089546 A1* | 7/2002 | Kanevsky et al. | 345/800 |
| 2004/0212635 A1 | 10/2004 | Mussini | |
| 2004/0261037 A1* | 12/2004 | Ording et al. | 715/788 |
| 2004/0261038 A1* | 12/2004 | Ording et al. | 715/792 |
| 2004/0268263 A1 | 12/2004 | Van Dok et al. | |
| 2005/0235219 A1 | 10/2005 | Szeto | |
| 2005/0288957 A1* | 12/2005 | Eraker et al. | 705/1 |
| 2006/0020904 A1 | 1/2006 | Aaltonen et al. | |
| 2006/0146059 A1* | 7/2006 | Inoue et al. | 345/546 |
| 2006/0236264 A1 | 10/2006 | Cain et al. | |
| 2006/0238515 A1 | 10/2006 | Ohshita | |
| 2006/0253796 A1 | 11/2006 | Wang et al. | |
| 2007/0250788 A1* | 10/2007 | Rigolet | 715/788 |
| 2008/0016458 A1* | 1/2008 | Good et al. | 715/780 |
| 2008/0082920 A1* | 4/2008 | Eom | 715/702 |
| 2008/0148164 A1* | 6/2008 | Read | 715/763 |
| 2008/0163104 A1* | 7/2008 | Haug | 715/788 |
| 2009/0199128 A1* | 8/2009 | Matthews et al. | 715/799 |
| 2011/0175930 A1* | 7/2011 | Hwang et al. | 345/629 |
| 2011/0261075 A1* | 10/2011 | Tanaka | 345/649 |

\* cited by examiner

AUTOMATICALLY TRANSFORMED GRAPHICAL USER INTERFACE

FIELD OF THE INVENTION

Embodiments relate generally to software and user interfaces. More specifically, automatically transformed graphical user interface techniques are described.

BACKGROUND OF THE INVENTION

Conventional graphical user interfaces have a number of limitations for applications that require graphical user interfaces of variable sizes and compositions during runtime. For example, some applications initially require a graphical user interface ("GUI") of certain size and composition then, at some points during runtime, require a GUI of different size, composition, or both. For instance, a typical database application starts up requiring a few interface elements for a user to provide query input. Conventional techniques typically deploy a GUI with additional elements to present query results even though the additional elements are not used to provide query input. At some points during runtime, some applications require a smaller GUI or fewer GUI elements than those required initially. For example, a video media player does not require a media window after playing a video. Conventional techniques typically do not adjust a GUI based on usage.

Conventional user interface techniques typically execute with a static GUI, which is fixed in size, position, and orientation at startup. At some point during runtime, the static GUI becomes too small or too large for a runtime condition, which typically requires more or fewer interface elements. Conventionally, users manually resize, reposition, or reorient the GUI to cater to runtime conditions. The need to manually manipulate a GUI discourages users from using or keeping an application running.

Another conventional technique is to provide additional windows (e.g., popup windows) when additional interface elements are needed. However, there are problems associated with popup windows. One problem is that a display screen becomes visually "cluttered" with popup windows. Also problematic is a new popup window typically disrupts the user experience by visually interrupting a user's attention and requiring user interaction or intervention (e.g., clicking on one or more buttons in the popup window to close it) before allowing a user to interact with an application's initial or main window or previously popped up windows. For example, if an application's main window provides five popup windows in succession, a user must interact with all five popup windows before being able to interact with the application's main window.

Thus, an automatically transformed graphical user interface without the limitations of conventional techniques is needed.

BRIEF DESCRIPTION OF THE FIGURES

Various examples are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided as examples and the described techniques may be practiced according to the claims without some or all of the accompanying details. For clarity, technical material that is known in the technical fields related to the examples has not been described in detail to avoid unnecessarily obscuring the description.

In some examples, the described techniques may be implemented as a computer program or application ("application") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including C, Objective C, C++, C#, Adobe® Integrated Runtime™ (Adobe® AIR™), ActionScript™, Flex™, Lingo™, Java™, Javascript™, Ajax, Perl, COBOL, Fortran, ADA, XML, MXML, HTML, DHTML, XHTML, HTTP, XMPP, and others. Design, publishing, and other types of applications such as Dreamweaver®, Shockwave®, Flash®, and Fireworks® may also be used to implement the described techniques. The described techniques may be varied and are not limited to the examples or descriptions provided.

Various examples of automatically transformed (i.e., resized and repositioned) graphical user interfaces are described, including transforming a graphical user interface in response to a runtime activity event or an input to change the composition (i.e., interface elements that are implemented as part of a graphical user interface) of a graphical user interface. A graphical user interface may be transformed from a two-dimensional arrangement, configuration, or structure ("arrangement") to a three-dimensional arrangement, or from a three-dimensional arrangement to a two-dimensional arrangement. Devices, computing systems, methods, and programming instructions that implement various techniques for automatically transformed graphical user interface are also described. The techniques may be applied in any device or system that uses a screen or display to render and display a graphical user interface. Various techniques for automatically transformed graphical user interface may be selectively applied. In other examples, various techniques, procedures, processes, or methods may be implemented differently and are not limited to the examples provided and described.

Figure 1A:
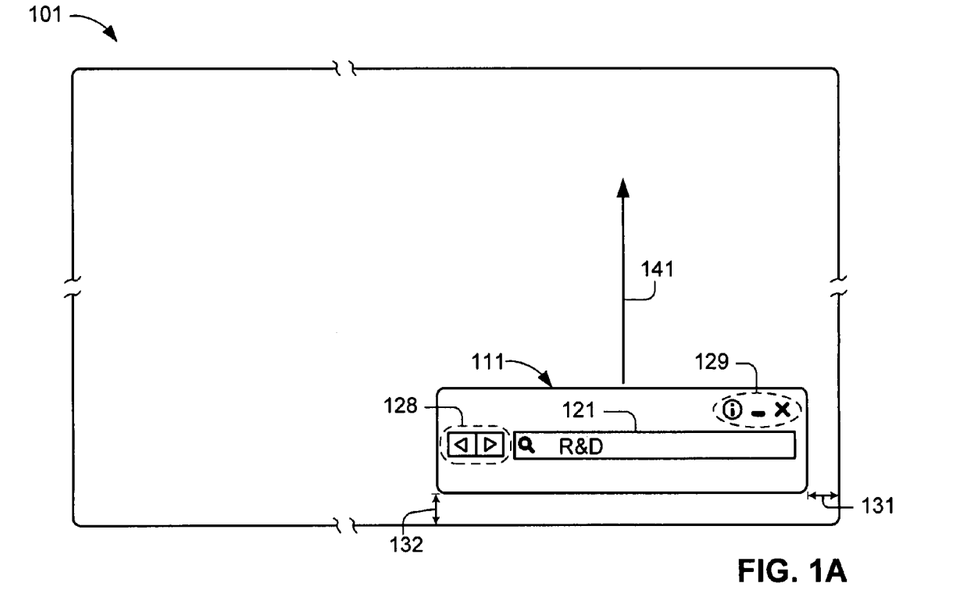
FIG. 1A illustrates an exemplary graphical user interface.

FIG. 1A illustrates an exemplary graphical user interface. Here, display 101 includes graphical user interface 111, interface elements 121, 128, 129, horizontal distance 131, vertical distance 132, and directional arrow 141. In some examples, display 101 shows a graphical user interface 111 for an application. The application may be in any state (e.g., starting up, before/after starting up, idling, waiting for input, or actively processing data). In some examples, there may be other applications having various forms of user interfaces (e.g., open windows and icons) sharing the screen space in display 101. Graphical user interface 111 is shown, for example, in the form of a bar-shaped user interface with interface elements 121, 128 and 129. In some examples, a user interface may have fewer or more interface elements than shown.

Here, graphical user interface 111 is presented in display 101 and positioned a horizontal distance 131 from the right border of display 101 and a vertical distance 132 from the bottom border of display 101. In some examples, graphical user interface 111 may be transformed into another user interface of any composition, form, size, position, orientation, rotation, or depth. As used herein, the term "composition" with respect to user interface may refer to a set of one or more elements and their placements (i.e., layout) that collectively form and implement a user interface or graphical user interface. The set of elements may include interface elements and non-interface element or static element. An interface element may be any element configured to receive input, output, or a combination thereof (e.g., any control, field, bar, widget, button, window, text box, selection list, menu, or others). A non-interface element may be static or ornamental in nature (e.g., separators, lines, shapes, or decorative images).

Figure 2A:
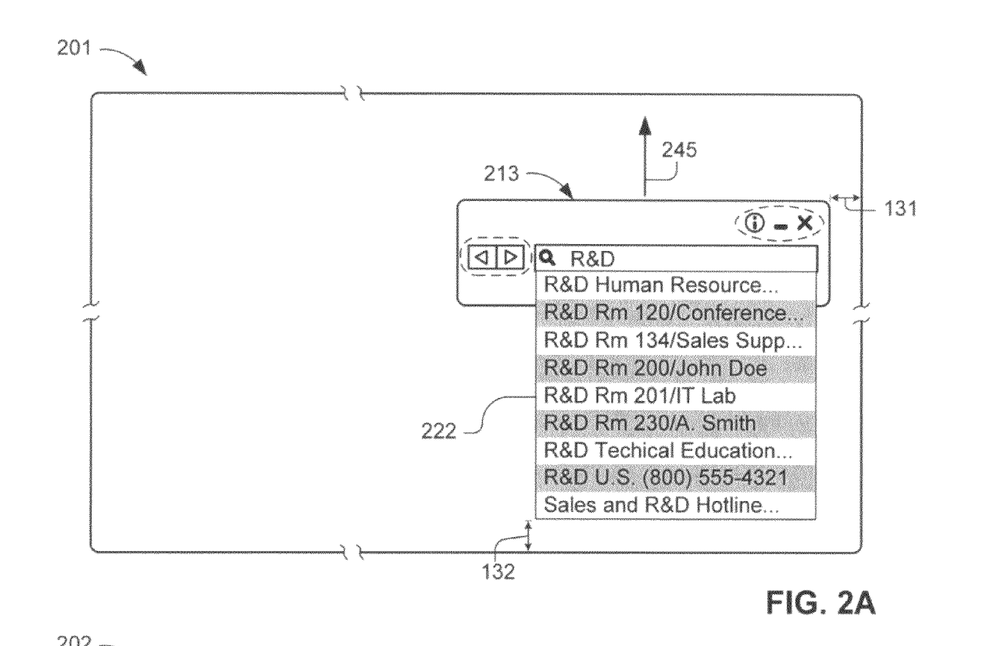
FIGS. 2A and 2B illustrate an exemplary graphical user interface in other forms.
Figure 2B:
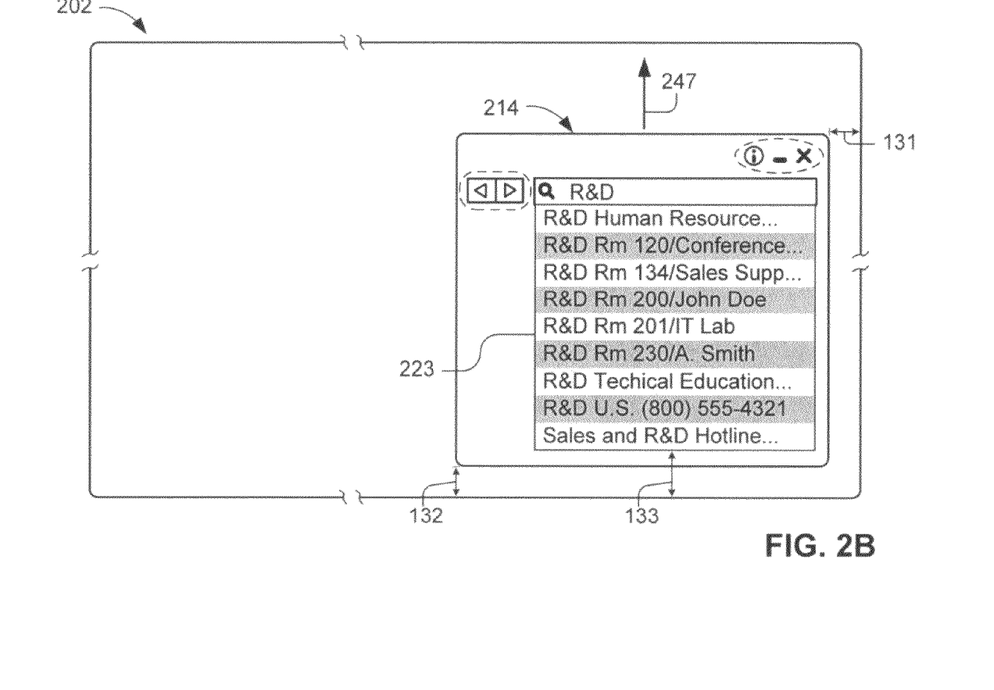

Arrow 141 shows one possible expansion direction for transforming graphical user interface 111 into graphical user interface 213 of FIG. 2A or graphical user interface 214 of FIG. 2B. In other examples, graphical user interface 111 may also be transformed from other layouts or user interface shapes (e.g., an icon). Graphical user interface 111 and the above-described features may be implemented differently and are not limited to the examples provided.

Figure 1B:
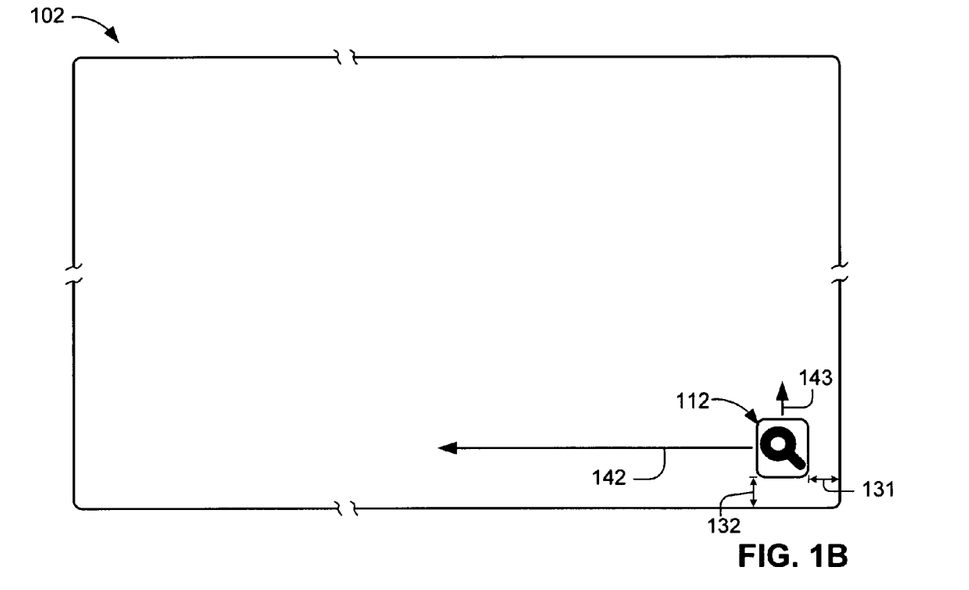
FIG. 1B illustrates an exemplary graphical user interface in an iconized form.

FIG. 1B illustrates an exemplary graphical user interface in an iconized form. Here, display 102 includes icon 112, shown with horizontal distance 131 and vertical distance 132, which are described in greater detail below, and arrows 142-143. In some examples, icon 112 may be transformed into, for example, graphical user interface 111 (FIG. 1A). Arrows 142 and 143 indicate the direction of transformation of icon 112 into, for example, graphical user interface 111. In other examples, icon 112 may be transformed into another user interface of any composition, form, size, or position.

In some examples, icon 112 may be positioned anywhere in a display, transformed from any position, or transformed to any position, such as near any corner, near any border, or somewhere near the center of a display (e.g., display 101 or 102). The distance from a border (e.g., horizontal distance 131 or vertical distance 132) may be a distance, for example, set by an operating system or application. In some examples, the distance from a border may be resulted from a user's action. For instance, an operating system, an application, or user may place (i.e., move using an input device (e.g., mouse, keyboard, touchpad, or the like)) a user interface (e.g., graphical user interface 111) of an application in a position of a display resulting in horizontal distance 131 and vertical distance 132.

In some examples, icon 112 may be transformed into graphical user interface 111 by expanding (i.e., resizing) a left edge and top edge of icon 112 as indicated by arrows 142 and 143, respectively, while keeping its bottom and right edges stationary. Thus, horizontal distance 131 and vertical distance 132 are maintained. In other examples, icon 112 may be transformed by moving upward and to the left to a new position, and then expanding the right and bottom edges of icon 112 to maintain horizontal distance 131 and vertical distance 132, respectively.

As shown collectively in FIGS. 1A and 1B, for example, graphical user interface 111 may maintain one or more aspects of icon 112. For example, graphical user interface 111 may maintain the same or substantially the same horizontal distance 131, vertical distance 132, or both. In some examples, graphical user interface 111 may be realigned or reoriented to dimensions of the originally-presented (i.e., displayed) graphical user interface 112 prior to transformation.

In response to a runtime activity event or an input to change a composition of an application's user interface (e.g., graphical user interface 111 or icon 112), an application may automatically, semi-automatically, or manually transform graphical user interface 111 into another form or layout. A runtime activity event may be any event associated with the execution of an application, such as interacting with a user, an operating system, or another application. In some examples, a runtime activity event may occur when an application detects an input (e.g., from a user activating an interface element), enters a state requesting input (e.g., from a user's), or presents output or data to a user.

In some examples, an input to change a user interface composition may occur when an application enters a state requesting input (e.g., requesting parameters from a user to query a directory). For example, an application may invoke graphical user interface 111 and render a composition of various user interface elements (e.g., text box, selection box, radio buttons, drop down lists, and others). An input to change a user interface composition may also be used to remove (e.g., removing a video panel after showing a video) or modify (e.g., resize an interface element) an interface element.

In some examples, a period of inactivity may trigger a change in the composition of an application's user interface. For example, changing the composition of graphical user interface 111 to icon 112 may be performed if inactivity is observed for a pre-determined time interval. In other examples, transformations of graphical user interface 111 may be invoked differently.

In some examples, an application may automatically transform graphical user interface 111 relative to one or more parameters (e.g., composition, size, position, orientation, rotation, or depth (e.g., three-dimensional)). For example, the composition of graphical user interface 111 may be changed (e.g., adding, removing, or changing interface elements). In some examples, graphical user interface 111 may be resized (e.g., expanded or collapsed) relative to one or more or its edges. Further, graphical user interface 111 may be resized to the size of an icon or smaller. Alternatively, the size of graphical user interface 111 may be increased to the size of display 101 or larger (i.e., using one or more parts of graphical user interface 111 not shown beyond display 101). In other examples, graphical user interface 111 may be positioned or repositioned anywhere in display 101. In still other examples, graphical user interface 111 may be oriented (i.e., positioned) relative to one or more edges or points in a display. For example, orienting graphical user interface 111 may be performed to maintain vertical distance 132, horizontal distance 131, or both. As another example, graphical user interface 111 may be rotated (e.g., from a horizontal shape to vertical shape, or to various degrees (e.g., 45, 90, 180, 270, and others)). An application may also transform (i.e., change) graphical user interface 111 from a two-dimensional arrangement to a three-dimensional arrangement or from a two-dimensional arrangement to a three-dimensional arrangement.

As shown in FIG. 1A, graphical user interface 111 is shown with a composition of interface elements 121, 128, and 129. A runtime activity event may occur, for example, when a user activates one of interface elements 121, 128, or 129. For example, graphical user interface 111 may be a user interface for a directory application. Here, interface element 121 may be an input interface element. A user may provide an input data entry of "R&D" using interface element 121 to query a directory application (not shown). To provide a better understanding of various techniques for automatically transformed user interface, various examples are described with an exemplary application (e.g., a directory application). The described techniques may be varied and are not limited to the type, configuration, or implementation of an application or the examples and descriptions provided. Further, the techniques described herein may be implemented with other applications (e.g., media, multi-media, image management, and file management applications).

In some examples, a query with input data entry of "R&D" produces, for example, output results that may be displayed. Query results may be presented in, for example, one or more interface elements (e.g., text panel, drop down list). Here, the application encounters an input (e.g., request) to change the composition (i.e., interface elements) of graphical user interface 111 to include one or more interface elements configured to present query results or output.

To add, remove, or change an interface element, an application (e.g., a directory application) may transform a graphical user interface (e.g., graphical user interface 111) to include, for example, a dropdown or "drawer" interface element for displaying query results. In some examples, graphical user interface 111 may be transformed (i.e., expanded and resized) upward, as indicated by arrow 141 to open up enough space for a dropdown interface element. In some examples, graphical user interface 111 may be transformed by first repositioning or shifting away from the bottom border of display 101 to provide enough space for a dropdown interface element. Then, graphical user interface 111 may be oriented downward to show a dropdown list with the query results and to maintain vertical distance 132. The transformed graphical user interface 111 is shown, for example, in FIGS. 2A and 2B. In other examples, display 102 and the above-described elements may be implemented differently and are not limited to the descriptions provided.

In some examples, the transformation of a graphical user interface (e.g., graphical user interface 111) may be shown by animation (i.e., showing movements and intermediate state changes from a pre-transformed graphical user interface to a transformed graphical user interface). For example, transforming graphical user interface 111 (FIG. 1A) to graphical user interface 213 (FIG. 2A) may be animated by showing graphical user interface 111 moving upward to stop at the position shown in display 201 (FIG. 2A). A "drawer" or dropdown interface element 222 is shown extending downwards, stopping to maintain vertical distance 132. Animating the transformation may provide a crucial user interface function by allowing users to follow the movements and changes of a graphical user interface and keeping users from being confused ("persistence of vision").

FIGS. 2A and 2B illustrate an exemplary graphical user interface in other forms. Here, display 201 includes graphical user interface 213 and interface element 222 (i.e., drop down menu). In some examples, graphical user interface 213 may be implemented with similar interface elements as those shown and described above in connection with FIG. 1A. Graphical user interface 213 is positioned relative to the borders or edges of display 201, as measured by horizontal distance 131 and vertical distance 132. In other examples, graphical user interface 213 may be floating (i.e., located) anywhere in display 201. In still other examples, graphical user interface 213 may be transformed with respect to a visible space in display 201. For example, graphical user interface 111 (FIG. 1A) may be repositioned in display 201 to avoid covering, or being covered by, another graphical user interface sharing display 201. In some examples, graphical user interface 213 is positioned over (i.e., covered) a part of another graphical user interface.

Here, graphical user interface 213 is shown with transparent window chrome, exposing interface element 222 without a window frame. Interface element 222 expands outwards from graphical user interface 213. However, the bottom border of interface element 222 expands to vertical distance 132, which is the same distance that graphical user interface 213 was positioned away from the bottom border of display 201. Thus, graphical user interface 213 automatically repositions upwards in the direction of arrow 245 to allow interface element 222 to expand toward the bottom border of display 201, but stopping to maintain vertical distance 132. In some examples, a graphical user interface 214 may include a window frame or chrome, as shown in FIG. 2B. With a window frame, vertical distance 132 may be maintained between the bottom border of display 201 and interface element 222. In some examples, gap 133 between the bottom of interface element 222 and the bottom border of display 202 may be wider than vertical distance 132. By not using unnecessary screen space in a display, more screen space is freed up for other applications. Further, automatically transformed graphical user interface techniques may reduce or eliminate manual resizing or repositioning. Further, an automatically transformed graphical user interface may be collapsed. For example, graphical user interface 213 or 214 may be collapsed into one of its pre-transformed forms (e.g., graphical user interface 111 or icon 102) after, for example, a period of inactivity is detected.

In some examples, graphical user interface 213 or 214 may be transformed into a larger graphical user interface. For example, a user may select an entry (e.g., "R&D Rm 200/John Doe") from data shown in interface element 222. User selection of data may be a runtime activity event. Graphical user interface 213 or 214 may expand, for example, in the direction of arrow 245 into another form or layout, such as that shown in FIG. 3A or 3B. In other examples, display 202 and the above-described elements may be implemented differently and are not limited to the examples shown and described.

Figure 3A:
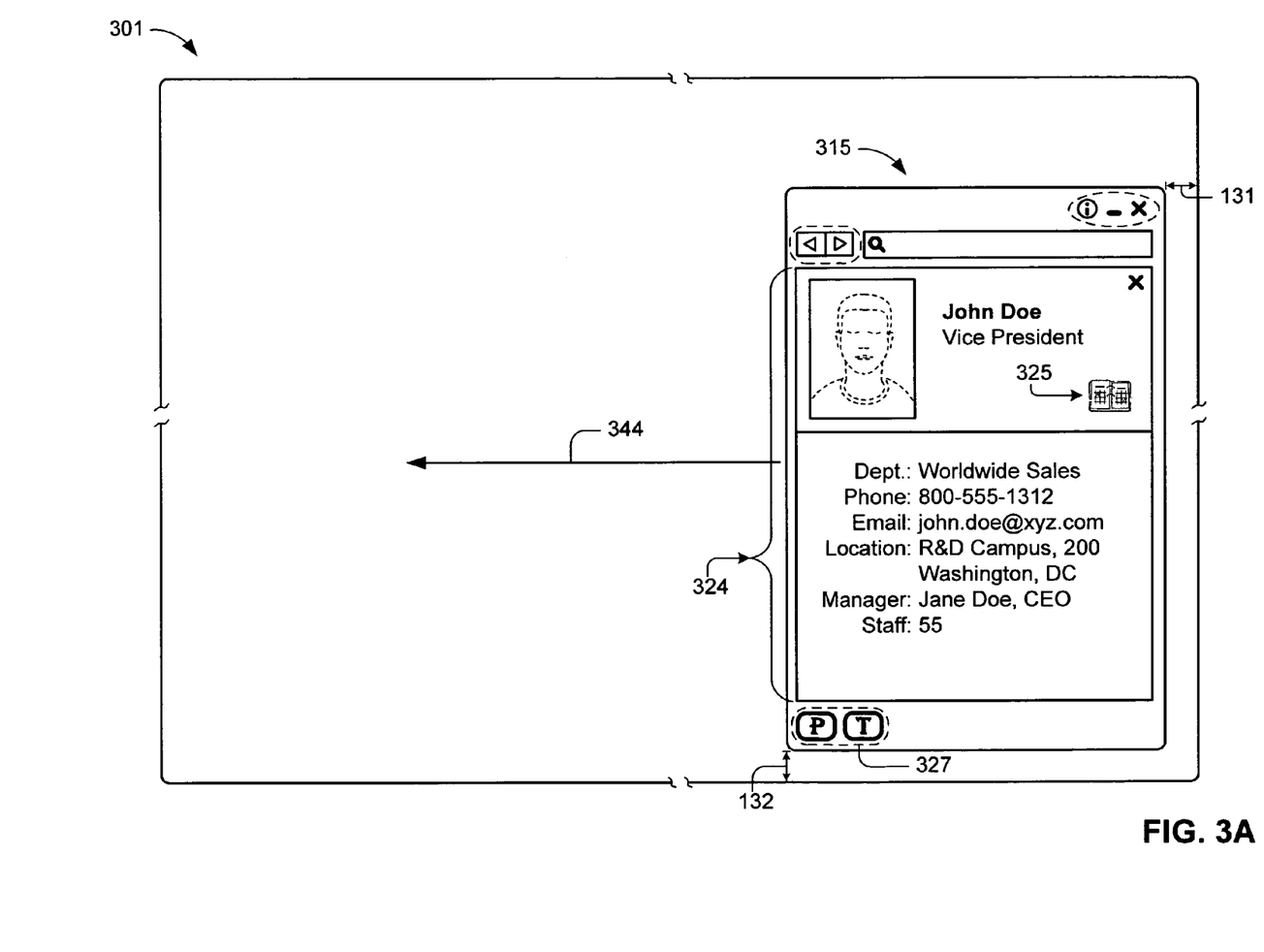
FIGS. 3A and 3B illustrate an exemplary graphical user interface in additional forms.
Figure 3B:
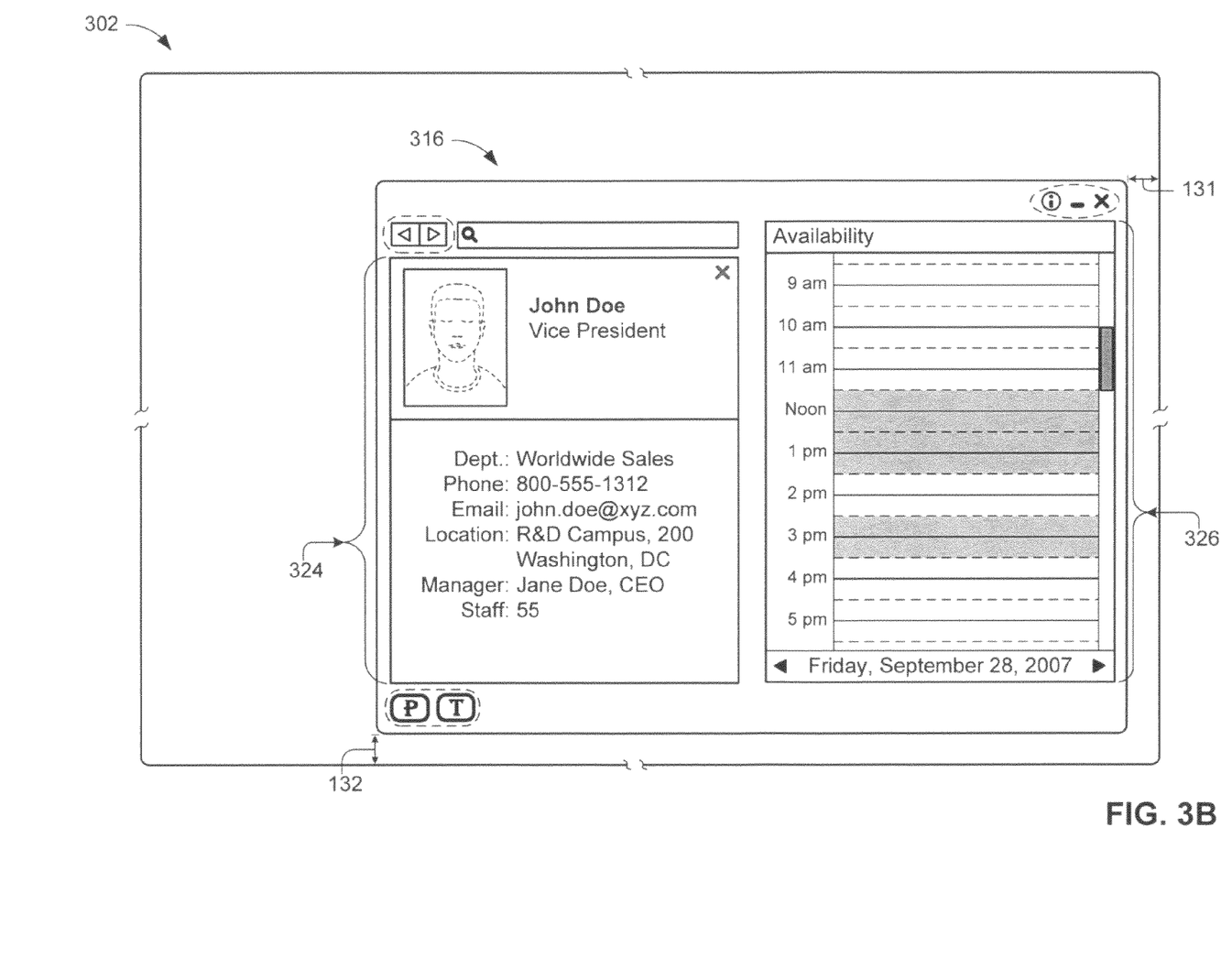

FIGS. 3A and 3B illustrate an exemplary graphical user interface in additional forms. In FIG. 3A, graphical user interface 315 is illustrated with additional interface elements 324, 325, and 327. Interface element 324 may be an information panel or output window for displaying, for example, a record of "John Doe". Before transforming into graphical user interface 315, graphical user interface 213 (FIG. 2A) may be transformed to include one or more of interface elements 324, 325, and 327. As shown in FIG. 3A, graphical user interface 315 may be a result of an upward transformation (e.g., arrow 245, FIG. 2A). For example, graphical user interface 213 (FIG. 2A) or 214 (FIG. 2B) may be resized, expanded, or repositioned to maintain vertical distance 132. Graphical user interface 315 may be further transformed in the direction of arrow 344, for example, if interface element 325 is activated.

FIG. 3B illustrates graphical user interface 316 that is similar to graphical user interface 315 (FIG. 3A), but which includes interface element 326. Graphical user interface 316 may be transformed from or into graphical user interface 213 (FIG. 2A), 214 (FIG. 2b), or 315 (FIG. 3A). Here, graphical user interface 316 illustrates a leftward transformation or expansion. To maintain horizontal distance 131, graphical user interface 316 may be repositioned or shifted left to provide space for interface element 326 and horizontal distance 131. In other examples, graphical user interface 316 may be transformed by expansion and resizing in any manner. Further, display 302 and the above-described elements may be implemented differently and are not limited to the examples shown and described.

Figure 3C:
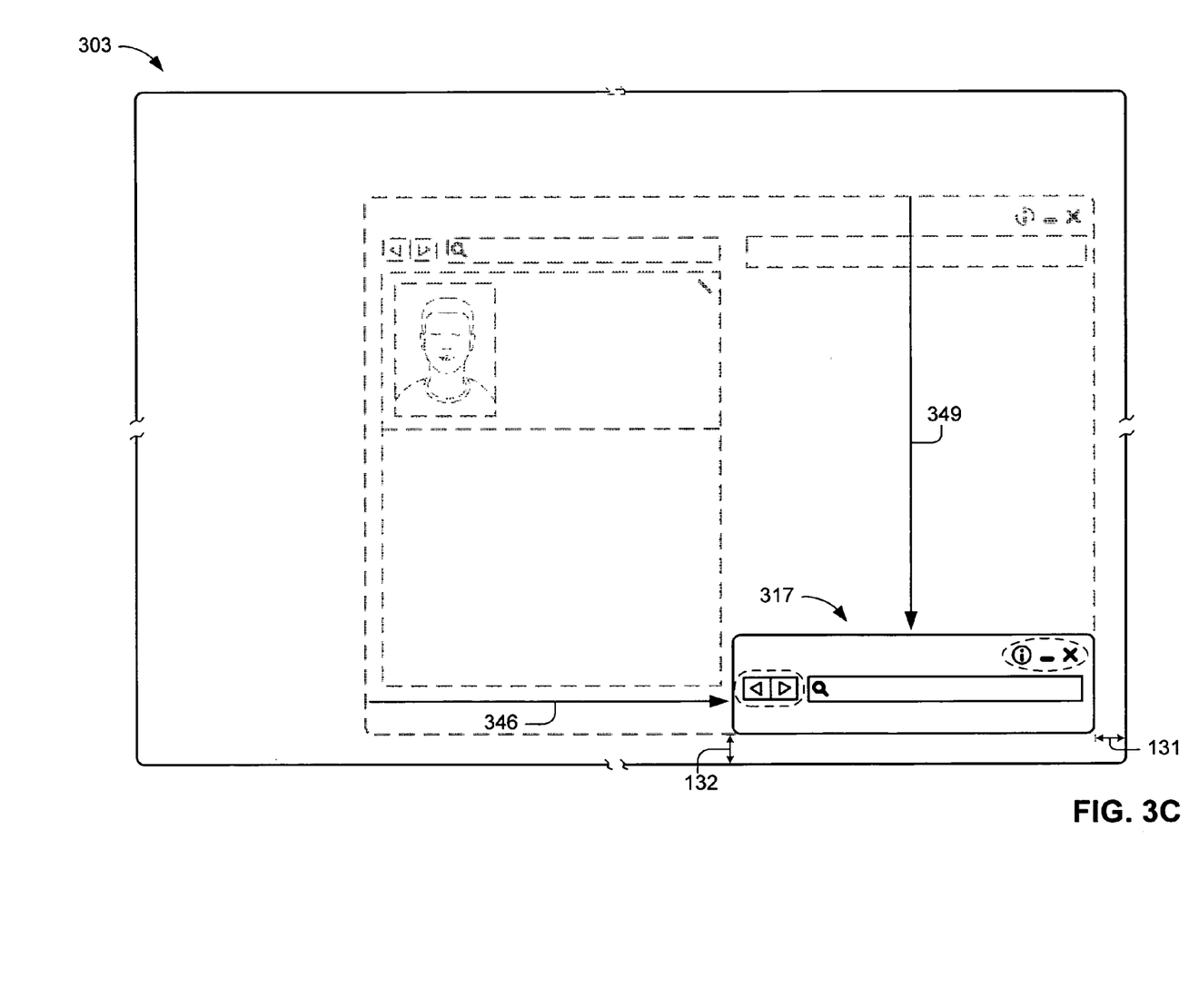
FIG. 3C illustrates an exemplary graphical user interface in a collapsed form.

FIG. 3C illustrates an exemplary graphical user interface in a collapsed form. Here, graphical user interface 317 may be collapsed following a period or time interval of inactivity or if another parameter has occurred. In some examples, collapsing panels associated with graphical user interface 316 (FIG. 3B) may be shown by arrows 346 and 349. In some examples, an application remembers the location, size, form, or composition of graphical user interface 317. When collapsed, graphical user interface 317 is restored to its original position and size, unless a user manipulates an input device to move graphical user interface while in a transformed form or layout. For example, a previous graphical user interface may be graphical user interface 315 (FIG. 3A). After a period of inactivity, an application (e.g., a directory application) may collapse graphical user interface 315 (FIG. 3A) into graphical user interface 317.

Not all enumerated features and properties pertaining to user interfaces, graphical user interfaces, automatically formatted graphical user interfaces, interface elements, user interface compositions, or runtime activity events, are included in the examples provided. In other examples, there may be additional features and properties. For example, there may be selection boxes, toggle buttons, other input or output interfaces, or management user interfaces, such as locking, viewing, printing, editing, and other operations. The above-described structures, features, operations, techniques, procedures, and other aspects may be varied in design, implementation, and function and are not limited to the descriptions provided.

Figure 4A:
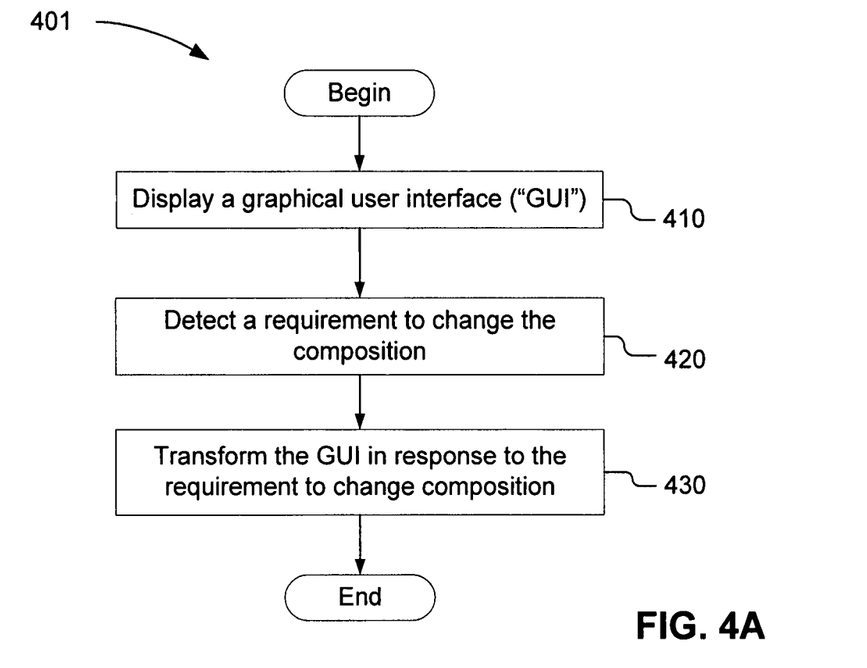
FIG. 4A is a flow diagram of an exemplary process for implementing an automatically transformed graphical user interface.

FIG. 4A is a flow diagram of an exemplary process for implementing an automatically transformed graphical user interface. Here, process 401 is suitable for implementation as, for example, a computer program code, software instructions, firmware, circuitry, logic, or hardware. A graphical user interface ("GUI") of an application is displayed or otherwise presented on a screen or in a display (410). The GUI has a composition of one or more interface elements, which may include input interface elements or output interface elements. The GUI may be inside another window or GUI of the application. In some examples, the GUI is an outer window (i.e., application-level GUI).

In some examples, the application, which may be any application that utilizes a graphical user interface, detects an input to change a graphical user interface composition (420). For example, adding another interface element, removing an existing interface element, or changing an existing interface element may be performed. In other examples, an input (e.g., request) to change a graphical user interface's composition may be performed when a period of inactivity is detected.

As an example, when an input requesting a change to a graphical user interface composition is received, an application may transform its graphical user interface to accommodate the new composition (430). The transformation may be performed by moving, resizing, expanding, collapsing, repositioning, orienting, or otherwise modifying the form or layout of an existing graphical user interface. In some examples, a transformation from a two-dimensional arrangement to a three-dimensional arrangement, or from a two-dimensional arrangement to a three-dimensional arrangement. During transformation, a graphical user interface may be reoriented with at least one edge along the same edge of a pre-transformed graphical user interface (e.g., to maintain horizontal distance 131, vertical distance 132, or both). In some examples, the above-described process may be varied in design, order, implementation, or other aspects, and is not limited to the examples shown and described.

Figure 4B:
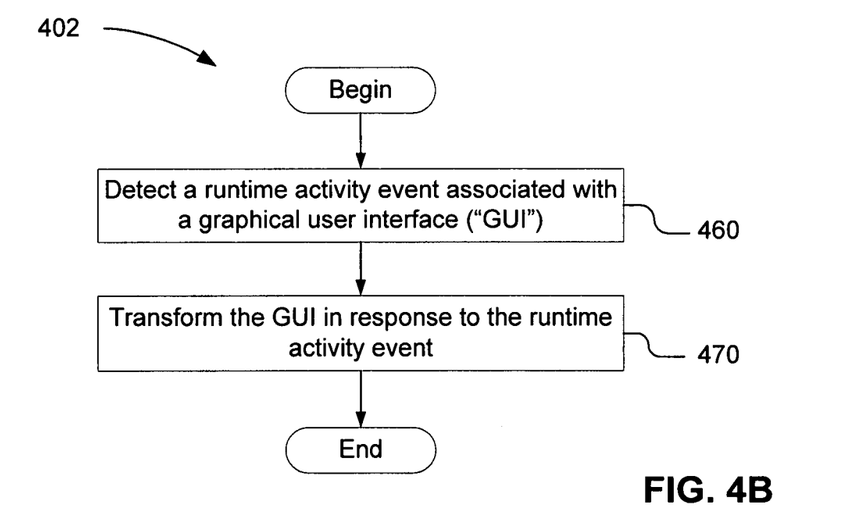
FIG. 4B is a flow diagram of an alternative exemplary process for implementing an automatically transformed graphical user interface.

FIG. 4B is a flow diagram of an alternative exemplary process for implementing an automatically transformed graphical user interface. Here, an application detects a runtime activity event associated with a graphical user interface (e.g., graphical user interface 111 (FIG. 1A)) (460). In some examples, a runtime activity event may be an interface element being activated, removed, changed, or otherwise accessed. In other examples, a runtime activity event may initiate the addition of another interface element. Likewise, an inactivity period associated with the application or a graphical user interface may also trigger a transformation of a graphical user interface.

In response to a runtime activity event, an application may transform a graphical user interface to implement a new composition (470). The transformation may be performed by resizing, expanding, collapsing, repositioning, or reorienting an existing graphical user interface. In some examples, a transformation may be from a two-dimensional arrangement to a three-dimensional arrangement, or from a three-dimensional arrangement to a two-dimensional arrangement. In the process of transformation, a graphical user interface may be resized, reposition, or reoriented with at least one edge corresponding to a fixed point in a display. The fixed point may be a point along a line that coincides with one edge of a pre-transformed graphical user interface (e.g., to maintain horizontal distance 131, vertical distance 132, or both). In some examples, the above-described process may be varied in design, order, implementation, or other aspects, and is not limited to the examples shown and described. Further, process 401 may be suitable for implementing as programming instructions or in an application, such as the exemplary application described in FIG. 5.

Figure 5:
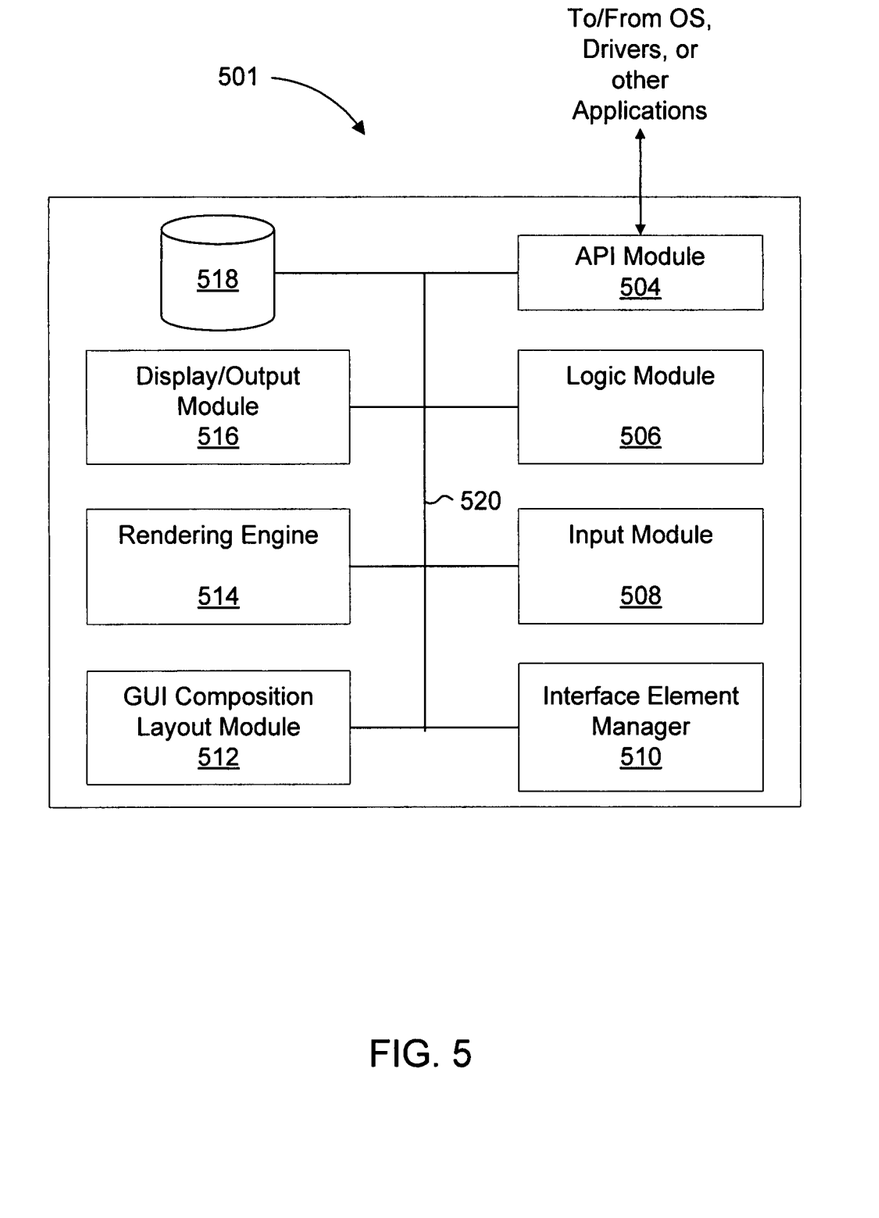
FIG. 5 illustrates an exemplary application architecture for automatically transforming graphical user interfaces.

FIG. 5 illustrates an exemplary application architecture for automatically transforming graphical user interfaces. Here, application 501 includes application programming interface ("API") module 504, logic module 506, input module 508, interface element manager 510, graphical user interface ("GUI") composition layout module 512, rendering engine 514, display/output module 516, repository 518, and bus 520. In some examples, API module 504, logic module 506, input module 508, interface element manager 510, GUI composition layout module 512, rendering engine 514, display/output module 516, and repository 518 may be in data communication with each other, other applications, operating systems, drivers, or the like using bus 520, which may be a logical or physical coupling configured to allow data transfer between processes such as those described. Further, API module 504 may be in data communication with one or more external processes (not shown) using actual or physical ports (not shown), processes, or other data interfaces. Other external processes may include, but are not limited to operating systems ("OS"), drivers (e.g., input/output, disk drive, and graphic circuit drivers), firmware, applications, state machines, virtual state machines, and others.

In some examples, when data is received by API module 504, it may be transferred to one or more other modules (e.g., logic module 506, input module 508, interface element manager 510, GUI composition layout module 512, rendering engine 514, display/output module 516, repository 518, and others) using bus 520. For example, after display/output module 516 has displayed one or more interface elements, API module 504 may receive from an input driver (not shown) input data, for example, to an interface element, move a GUI, or otherwise interact with a GUI. The input data may be transferred to input module 508 for interpretation (e.g., determining which interface element is being interfaced) and transferred to display/output module 516 to display the interface element, for example, in an automatically transformed graphical user interface.

In some examples, logic module 506 may be configured to control the data flow through bus 520 and direct the services provided by API module 504, input module 508, interface element manager 510, GUI composition layout module 512, rendering engine 514, display/output module 516, and repository 518 in order to implement various techniques for automatically transformed graphical user interface according to various embodiments. For example, an employee directory may be stored in repository 518. In response to an input from an interface element, logic module 506 may direct interface element manager 510 to add another interface element to present an employee record from repository 518, direct rendering engine 514 to render a transformed graphical user interface, and direct display/output module 516 to display the employee record in an automatically transformed graphical user interface.

Application 501 and the above-described modules and elements may be varied in design, function, configuration, or implementation and are not limited to the descriptions provided above.

Figure 6:
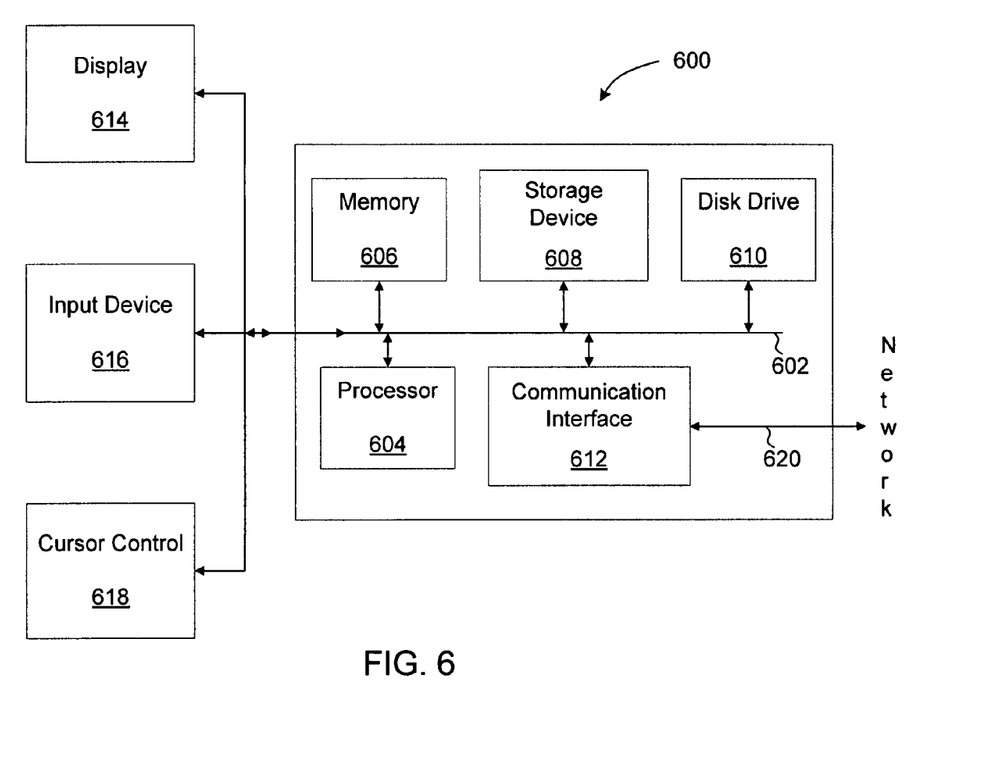
FIG. 6 illustrates an exemplary computer system suitable for implementing various techniques for an automatically transformed graphical user interface.

FIG. 6 illustrates an exemplary computer system suitable for implementing various techniques for automatically transformed graphical user interface. In some examples, computer system 600 may be used to implement computer programs, applications, methods, processes, or other software to perform the above-described techniques. Computer system 600 includes a bus 602 or other communication mechanism for communicating information, which interconnects subsystems and devices, such as processor 604, system memory 606 (e.g., RAM), storage device 608 (e.g., ROM), disk drive 610 (e.g., magnetic or optical), communication interface 612 (e.g., modem or Ethernet card), display 614 (e.g., CRT or LCD), input device 616 (e.g., keyboard), and cursor control 618 (e.g., mouse or trackball). Processor 604 can be a single-core, dual-core, or multi-core processor; and processor 604 can be a processor in a multi-processor environment or a distributed processing environment.

According to some examples, computer system 600 performs specific operations by processor 604 executing one or more sequences of one or more instructions stored in system memory 606. Such instructions may be read into system memory 606 from another computer readable medium, such as static storage device 608 or disk drive 610. In some examples, circuitry may be used in place of or in combination with software instructions for implementation.

The term "computer readable medium" refers to any medium that participates in providing instructions to processor 604 for execution. Such a medium may take many forms, including but not limited to, non-volatile media, volatile media, and transmission media. Non-volatile media includes, for example, optical or magnetic disks, such as disk drive 610. Volatile media includes dynamic memory, such as system memory 606. Transmission media includes coaxial cables, copper wire, and fiber optics, including wires that comprise bus 602. Transmission media can also take the form of acoustic or light waves, such as those generated during radio wave and infrared data communications.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer can read.

In some examples, execution of the sequences of instructions may be performed by a single computer system 600. According to some examples, two or more computer systems 600 coupled by communication link 620 (e.g., LAN, PSTN, or wireless network) may perform the sequence of instructions in coordination with one another. Computer system 600 may transmit and receive messages, data, and instructions, including program, i.e., application code, through communication link 620 and communication interface 612. Received program code may be executed by processor 604 as it is received, and/or stored in disk drive 610, or other non-volatile storage for later execution.

The foregoing examples have been described in some detail for purposes of clarity of understanding, but are not limited to the details provided. There are many alternative ways and techniques for implementation. The disclosed examples are illustrative and not restrictive.

What is claimed:

1. A method, comprising:
  displaying a graphical user interface in a first position, the graphical user interface having a composition comprising an interface element;
  detecting an input to change the composition; and
  transforming the graphical user interface in response to the input, wherein the transforming comprises:
    determining that the changed composition would cause the graphical user interface to overlap a border of a display;
    in response to said determining, without the changed composition overlapping the border of the display:
      moving the graphical user interface to a second position farther away from the border than the first position; and
      adjusting toward the border at least one edge of the graphical user interface nearest the border, wherein said adjusting includes adding content corresponding to the changed composition to the graphical user interface;
  wherein said determining, said moving, and said adjusting are all performed automatically in response to the input, and wherein said moving and said adjusting results in the changed composition being fully displayed.

2. The method of claim 1, further comprising:
  receiving another input; and moving the graphical user interface from the second position to the first position unless the another input indicates that the graphical user interface is moved from the second position.

3. The method of claim 1, wherein the input comprises at least one of adding another interface element, removing the interface element, changing the size of the interface element, or detecting inactivity in a time interval.

4. The method of claim 1, wherein said moving and said adjusting are performed relative to a visible space in the display.

5. The method of claim 1, further comprising collapsing the graphical user interface in response to detecting another input to change the composition.

6. The method of claim 1, wherein the transforming the graphical user interface further comprises transforming the graphical user interface from a two-dimensional structure to a three-dimensional structure.

7. The method of claim 1, wherein the transforming the graphical user interface further comprises transforming the graphical user interface from a three-dimensional structure to a two-dimensional structure.

8. A system, comprising:
a memory configured to store data associated with a graphical user interface; and
a processor configured to display a graphical user interface in a first position, the graphical user interface having a composition comprising an interface element, to detect an input to change the composition, and to transform the graphical user interface in response to the input comprising:
determining that the changed composition would cause the graphical user interface to overlap a border of a display;
in response to said determining, without the changed composition overlapping the border of the display:
moving the graphical user interface to a second position farther away from the border than the first position; and
adjusting toward the border at least one edge of the graphical user interface nearest the border, wherein said adjusting includes adding content corresponding to the changed composition to the graphical user interface;
wherein said determining, said moving, and said adjusting are all performed automatically in response to the input, and wherein said moving and said adjusting results in the changed composition being fully displayed.

9. A computer program product embodied in a non-transitory computer-readable medium and comprising computer instructions, wherein the computer instructions are executable to perform:
displaying a graphical user interface in a first position, the graphical user interface having a composition comprising an interface element;
detecting an input to change the composition; and
transforming the graphical user interface in response to the input, wherein the transforming comprises:
determining that the changed composition would cause the graphical user interface to overlap a border of a display;
in response to said determining, without the changed composition overlapping the border of the display:
moving the graphical user interface to a second position farther away from the border than the first position; and
adjusting toward the border at least one edge of the graphical user interface nearest the border, wherein said adjusting includes adding content corresponding to the changed composition to the graphical user interface;
wherein said determining, said moving, and said adjusting are all performed automatically in response to the input, and wherein said moving and said adjusting results in the changed composition being fully displayed.

10. The computer program product of claim 9, wherein the input indicates at least one of adding another interface element, removing the interface element, changing the size of the interface element, or detecting inactivity in a period of time.

11. The computer program product of claim 9, wherein computer instructions are further executable to perform collapsing the graphical user interface.

12. A method, comprising:
detecting a runtime activity event associated with a graphical user interface;
transforming the graphical user interface in response to the runtime activity event, wherein the transforming comprises:
determining that transforming the graphical user interface would result in the graphical user interface overlapping a border of a display;
in response to said determining, without the changed composition overlapping the border of the display:
moving the graphical user interface to a new position farther away from the border;
adjusting toward the border at least one edge of the graphical user interface nearest the border, wherein said adjusting includes adding content corresponding to the changed composition to the graphical user interface;
wherein said determining, said moving, and said adjusting are all performed automatically in response to the runtime activity event, and wherein said moving and said adjusting results in the changed composition being fully displayed.

13. The method of claim 12, wherein the runtime activity event comprises at least one of adding another interface element, removing the interface element, changing the size of the interface element, or detecting inactivity in a period of time.

14. The method of claim 12, further comprising collapsing the graphical user interface in response to detecting another runtime activity event.

* * * * *